(12) United States Patent  
Kishimoto et al.

(10) Patent No.: US 11,597,320 B2  
(45) Date of Patent: Mar. 7, 2023

(54) VEHICLE CONTROL SYSTEM

(71) Applicant: HONDA MOTOR CO., LTD., Tokyo (JP)

(72) Inventors: Takashi Kishimoto, Saitama (JP); Yoshifumi Nakamura, Saitama (JP); Noriyuki Imaeda, Saitama (JP); Jun Ishii, Tokyo (JP); Daiki Higuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 238 days.

(21) Appl. No.: 17/112,089

(22) Filed: Dec. 4, 2020

(65) Prior Publication Data

US 2021/0170948 A1  Jun. 10, 2021

(30) Foreign Application Priority Data

Dec. 9, 2019  (JP) .............................. JP2019-222122

(51) Int. Cl.
*B60R 1/00*  (2022.01)
*B60W 50/14*  (2020.01)

(52) U.S. Cl.
CPC ............ *B60R 1/002* (2013.01); *B60W 50/14* (2013.01); *B60R 2300/802* (2013.01); *B60W 2050/146* (2013.01); *B60W 2420/42* (2013.01)

(58) Field of Classification Search
CPC ............ B60R 1/002; B60R 2300/802; B60R 2300/8033; B60R 2300/804;

(Continued)

(56) References Cited

U.S. PATENT DOCUMENTS

2016/0027176 A1*  1/2016  Zeng .................... G06T 7/80  
                                                  348/148  
2018/0105184 A1*  4/2018  Urano ................. B60W 30/09  
(Continued)

FOREIGN PATENT DOCUMENTS

JP        4898357 B2    3/2012  
WO     2019026469 A1    2/2019

OTHER PUBLICATIONS

Notice of Reasons for Refusal for Patent Application JP 2019-222122; 11 pp.

*Primary Examiner* — Nathnael Aynalem  
(74) *Attorney, Agent, or Firm* — Armstrong Teasdale LLP (57) ABSTRACT

A vehicle control system includes a control device configured to execute automatic driving control of a vehicle; an image capturing device configured to capture a surrounding image of the vehicle; and a recording device configured to record the surrounding image. The control device includes: a function classifying unit configured to classify functions of the automatic driving control into a first automatic driving function and a second automatic driving function; a state determining unit configured to determine whether the recording device is in a recordable state; and a function restricting unit configured to permit use of the first automatic driving function in a case where the state determining unit determines that the recording device is in the recordable state, and to prohibit the use of the first automatic driving function in a case where the state determining unit determines that the recording device is not in the recordable state.

9 Claims, 4 Drawing Sheets

(58) Field of Classification Search
CPC ...... B60R 2300/8046; B60R 2300/806; B60R 2300/8066; B60R 2300/8073; B60R 2300/8093; B60R 2300/8086; B60W 50/14; B60W 50/087; B60W 2420/42; B60W 50/02; B60W 50/0205; B60W 2050/02; B60W 2050/0215; B60W 30/085; B60W 30/09
USPC ........................................................ 348/148
See application file for complete search history.

(56) References Cited

U.S. PATENT DOCUMENTS

2019/0227547 A1\* 7/2019 Sugahara ................. G08G 1/16
2021/0086789 A1\* 3/2021 Oyama ................. G06V 20/56

\* cited by examiner

| function of automatic driving control | function A | function B | function C | function D | function E | function F | ... |
|---|---|---|---|---|---|---|---|
| classification of function | 2 | 1 | 2 | 2 | 1 | 1 | ... | classification of function "1": first automatic driving function
classification of function "2": second automatic driving function

Fig.4

VEHICLE CONTROL SYSTEM

TECHNICAL FIELD

The present invention relates to a vehicle control system.

BACKGROUND ART

Conventionally, a vehicle control system includes an image capturing device configured to capture a surrounding image of a vehicle and a recording device configured to record the surrounding image of the vehicle (for example, Japanese Patent No. 4898357).

When a certain automatic driving function (for example, an automatic driving function with a relatively high degree of automation) is used in a vehicle control system configured to execute automatic driving control of a vehicle, it is desirable to record a surrounding image of the vehicle so that the cause of the event that has occurred with regard to the vehicle can be easily identified. However, a conventional vehicle control system does not take such a matter into consideration, and thus the automatic driving function that requires recording of the surrounding image of the vehicle may be used in a state where a recording device cannot record the surrounding image of the vehicle.

SUMMARY OF THE INVENTION

In view of such a problem of the prior art, a primary object of the present invention is to restrict use of an automatic driving function that requires recording of a surrounding image of a vehicle in a state where a recording device cannot record the surrounding image of the vehicle, in a vehicle control system configured to execute automatic driving control of the vehicle.

To achieve such an object, one embodiment of the present invention provides a vehicle control system (1) including: a control device (14) configured to execute automatic driving control of a vehicle (2); an image capturing device (45) configured to capture a surrounding image of the vehicle; and a recording device (21) configured to record the surrounding image, wherein the control device includes: a function classifying unit (52) configured to classify functions of the automatic driving control into a first automatic driving function that requires recording of the surrounding image and a second automatic driving function that does not require the recording of the surrounding image; a state determining unit (54) configured to determine whether the recording device is in a recordable state in which the recording device can record the surrounding image; and a function restricting unit (55) configured to permit use of the first automatic driving function in a case where the state determining unit determines that the recording device is in the recordable state, and to prohibit the use of the first automatic driving function in a case where the state determining unit determines that the recording device is not in the recordable state.

According to this arrangement, in a state where the recording device cannot record the surrounding image of the vehicle, it is possible to restrict the use of the first automatic driving function that requires the recording of the surrounding image of the vehicle.

In the above arrangement, preferably, the function restricting unit is configured to permit use of the second automatic driving function regardless of a determination result of the state determining unit.

According to this arrangement, regardless of whether the recording device is in the recordable state, it is possible to permit the use of the second automatic driving function that does not require the recording of the surrounding image of the vehicle and thus to reduce a driving burden on an occupant.

In the above arrangement, preferably, the recording device is configured to record the surrounding image in response to a recording request signal from the control device, and mode of the control device is switchable between transmittable mode in which the control device can transmit the recording request signal to the recording device and transmission stop mode in which the control device stops transmitting the recording request signal to the recording device.

According to this arrangement, it is possible to decide whether to record the surrounding image of the vehicle according to a desire of the occupant, so that the vehicle control system becomes more convenient.

In the above arrangement, preferably, in a case where the state determining unit determines that the recording device is in the recordable state while the mode of the control device is set to the transmittable mode, the function restricting unit permits the use of the first automatic driving function, and in a case where the state determining unit determines that the recording device is not in the recordable state while the mode of the control device is set to the transmittable mode, the function restricting unit prohibits the use of the first automatic driving function.

According to this arrangement, in a state where the mode of the control device is set to the transmittable mode and the recording device cannot record the surrounding image of the vehicle, it is possible to restrict the use of the first automatic driving function that requires the recording of the surrounding image of the vehicle.

In the above arrangement, preferably, the function restricting unit is configured to permit the use of the first automatic driving function regardless of a determination result of the state determining unit while the mode of the control device is set to the transmission stop mode.

According to this arrangement, in a state where the mode of the control device is set to the transmission stop mode, it is possible to use the first automatic driving function that requires the recording of the surrounding image of the vehicle while recording the surrounding image of the vehicle by a recorder (for example, a drive recorder on the market) other than the recording device. Accordingly, the vehicle control system becomes more convenient.

In the above arrangement, preferably, the function restricting unit is configured to prohibit the use of the first automatic driving function regardless of a determination result of the state determining unit while the mode of the control device is set to the transmission stop mode.

According to this arrangement, in a state where the mode of the control device is set to the transmission stop mode, it is possible to restrict the use of the first automatic driving function that requires the recording of the surrounding image of the vehicle.

In the above arrangement, preferably, the mode of the control device is switchable between the transmittable mode and the transmission stop mode only in response to a signal from an external device.

According to this arrangement, it is possible to install the external device in a specific establishment (for example, a store where vehicles are sold or repaired), and to prevent the occupant from accidentally switching the mode of the control device between the transmittable mode and the transmission stop mode.

In the above arrangement, preferably, the vehicle control system further includes a display device (48) configured to indicate that the use of the first automatic driving function is prohibited in the case where the state determining unit determines that the recording device is not in the recordable state.

According to this arrangement, in a case where the use of the first automatic driving function is prohibited since the recording device cannot record the surrounding image of the vehicle, it is possible to notify the occupant of this prohibition and to prompt the occupant to inspect or replace the recording device.

In the above arrangement, preferably, the image capturing device includes plural cameras (46) configured to capture images of a front side, a rear side, a left side, and a right side of the vehicle, respectively.

According to this arrangement, it is possible to accurately recognize the surrounding situation of the vehicle based on the surrounding image of the vehicle captured by the image capturing device.

Thus, according to the above arrangements, it is possible to restrict use of an automatic driving function that requires recording of a surrounding image of a vehicle in a state where a recording device cannot record the surrounding image of the vehicle.

DESCRIPTION OF THE PREFERRED EMBODIMENT(S)

<The Vehicle Control System 1>

In the following, a vehicle control system 1 according to an embodiment of the present invention will be described with reference to the drawings. The vehicle control system 1 is mounted on a vehicle 2 such as a four-wheeled automobile, and is configured to control the vehicle 2.

Figure 1:
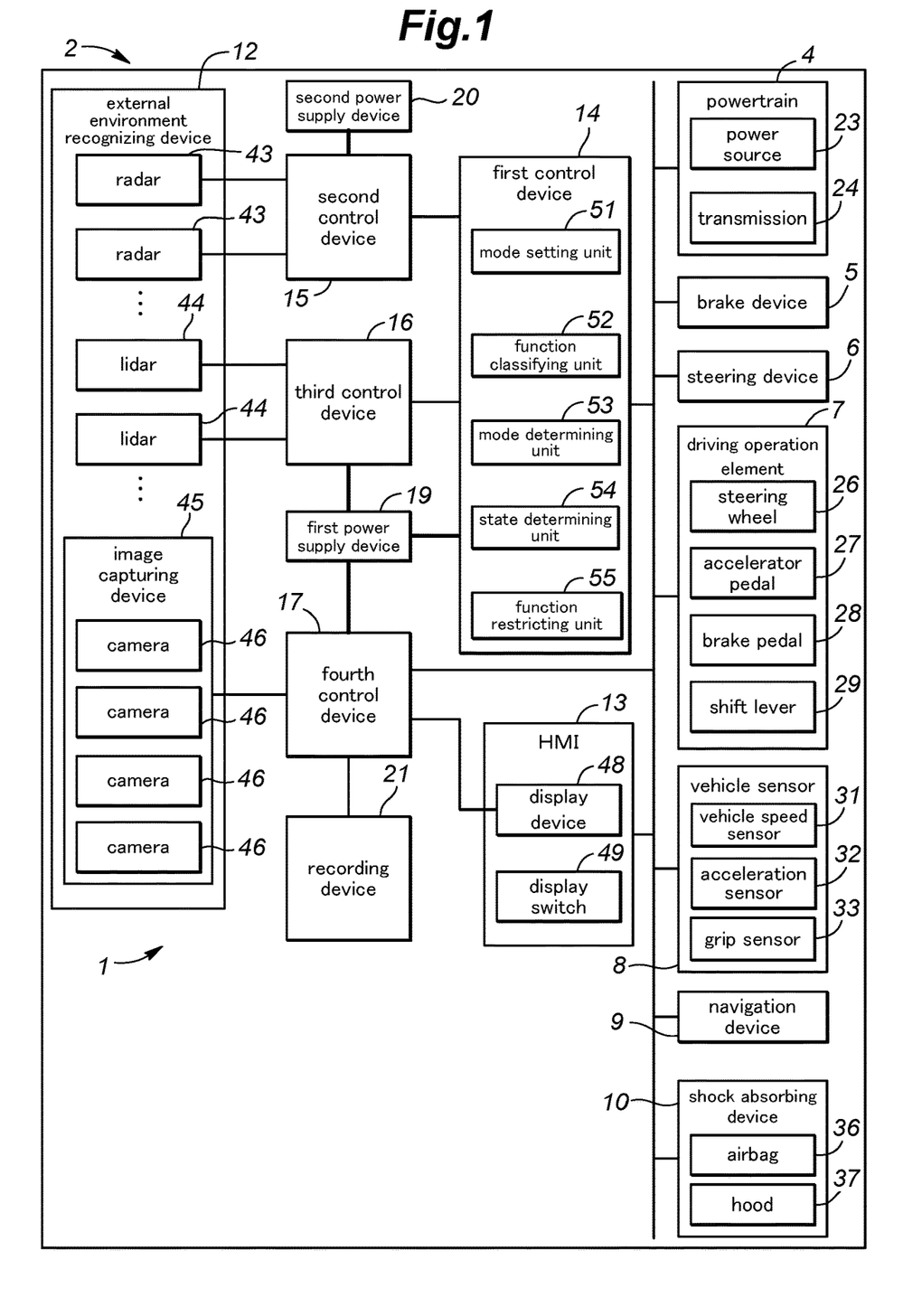
FIG. 1 is a block diagram of a vehicle control system according to an embodiment.

With reference to FIG. 1, the vehicle control system 1 includes a powertrain 4, a brake device 5, a steering device 6, a driving operation element 7, a vehicle sensor 8, a navigation device 9, a shock absorbing device 10, an external environment recognizing device 12, a Human Machine Interface 13 (HMI), first to fourth control devices 14 to 17, first and second power supply devices 19 and 20, and a recording device 21. In the following, the above-mentioned components of the vehicle control system 1 will be described one by one.

The powertrain 4 is a device configured to apply a driving force to the vehicle 2. For example, the powertrain 4 includes a power source 23 and a transmission 24. The power source 23 includes at least one of an internal combustion engine such as a gasoline engine or a diesel engine and an electric motor.

The brake device 5 is a device configured to apply a brake force to the vehicle 2. For example, the brake device 5 includes a brake caliper configured to press a pad against a brake rotor, and an electric cylinder configured to supply an oil pressure to the brake caliper.

The steering device 6 is a device configured to change a steering angle of wheels. For example, the steering device 6 includes a rack-and-pinion mechanism configured to steer (turn) the wheels, and an electric motor configured to drive the rack-and-pinion mechanism.

The driving operation element 7 is an operation element provided inside a vehicle cabin and configured to receive a driving operation of the vehicle 2 by an occupant. For example, the driving operation element 7 includes a steering wheel 26 configured to receive a steering operation of the vehicle 2, an accelerator pedal 27 configured to receive an acceleration operation of the vehicle 2, a brake pedal 28 configured to receive a brake operation of the vehicle 2, a shift lever 29 configured to receive an operation for switching a shift range of the vehicle 2. For example, the shift range of the vehicle 2 includes a forward range, a reverse range, a neutral range, a parking range, and the like. The forward range is a shift range to transmit a driving force of the power source 23 to the wheels and thus to move the vehicle 2 forward. The reverse range is a shift range to transmit the driving force of the power source 23 to the wheels and thus to reverse the vehicle 2. The neutral range is a shift range in which the wheels are rotatable and the driving force of the power source 23 is not transmitted to the wheels. The parking range is a shift range in which the rotation of the wheels is restricted and the driving force of the power source 23 is not transmitted to the wheels.

The vehicle sensor 8 is a sensor configured to detect various vehicle states (namely, various states of the vehicle 2). For example, the vehicle sensor 8 includes a vehicle speed sensor 31 configured to detect the vehicle speed of the vehicle 2, an acceleration sensor 32 configured to detect the acceleration of the vehicle 2, and a grip sensor 33 configured to detect that the occupant grips the steering wheel 26.

The navigation device 9 is a device configured to acquire the current position of the vehicle 2 and to provide route guidance to a destination or the like. The navigation device 9 includes a GPS receiving unit and a map storing unit. The GPS receiving unit is configured to identify the current position (latitude and longitude) of the vehicle 2 based on a signal received from an artificial satellite (positioning satellite). The map storing unit includes a flash memory, a hard disk, and the like, and is configured to store map information.

The shock absorbing device 10 is a device configured to absorb a shock caused by a collision (hereinafter referred to as "vehicle collision") between the vehicle 2 and an object outside the vehicle 2 (for example, another vehicle, an obstacle, or a pedestrian). For example, the shock absorbing device 10 includes an airbag 36 and a hood 37 (a pop-up hood). For example, the airbag 36 is provided in the steering wheel 26 and/or a passenger seat. The airbag 36 is deployed at occurrence of the vehicle collision, thereby reducing an impact on the occupant. For example, the hood 37 is configured to cover the power source 23 from above. The hood 37 is partially lifted at the occurrence of the vehicle collision, thereby forming a space between the hood 37 and the power source 23 and reducing an impact on the pedestrian.

The external environment recognizing device 12 is a device configured to detect the object outside the vehicle 2. For example, the external environment recognizing device 12 includes plural radars 43, plural lidars 44, and an image capturing device 45. Each radar 43 emits radio waves such as millimeter waves around the vehicle 2 and captures the reflected radio waves, thereby detecting a position of the object outside the vehicle 2 (the distance between the vehicle 2 and the object outside the vehicle 2 and the direction of the object outside the vehicle 2). Each lidar 44 emits light such as infrared rays around the vehicle 2 and captures the reflected light, thereby detecting the position of the object outside the vehicle 2. The image capturing device 45 is a device configured to capture a surrounding image of the vehicle 2 (hereinafter simply referred to as "the surrounding image"). The surrounding image captured by the image capturing device 45 is a moving image. In another embodiment, the surrounding image captured by the image capturing device 45 may be a static image. The image capturing device 45 includes four cameras 46 configured to capture images of a front side, a rear side, a left side, and a right side of the vehicle 2, respectively. Accordingly, it is possible to accurately recognize a surrounding situation of the vehicle 2 based on the surrounding image captured by the image capturing device 45.

The HMI 13 is an input/output device configured to notify the occupant of various pieces of information and to receive an input operation by the occupant. For example, the HMI 13 includes a display device 48 and a display switch 49. The display device 48 includes a display screen such as a liquid crystal display or an organic EL display, and is configured to display the surrounding image. The display switch 49 is configured to receive a display operation of the surrounding image (namely, an operation to display the surrounding image) performed by the occupant.

Each of the first to fourth control devices 14 to 17 consists of an electronic control unit (ECU) including a CPU, a ROM, a RAM, and the like, and operates as the CPU executes arithmetic processing according to a program.

The first control device 14 is connected to the powertrain 4, the brake device 5, the steering device 6, the driving operation element 7, the vehicle sensor 8, the navigation device 9, the shock absorbing device 10, the HMI 13, and the like via a communication network such as a Controller Area Network (CAN).

The first control device 14 is configured to execute automatic driving control of the vehicle 2. When executing the automatic driving control, the first control device 14 controls at least one of the powertrain 4, the brake device 5, and the steering device 6 regardless of an operation on the driving operation element 7 by the occupant. For example, the automatic driving control executed by the first control device 14 includes Minimal Risk Maneuver (MRM), Side Collision Mitigation (SCM), Road Departure Mitigation (RDM), and Auto Lane Change (ALC). MRM is the control to move the vehicle 2 to a safe place and to cause an emergency stop of the vehicle 2 while degenerating the automatic driving control in a case where the occupant does not respond to the driving change request from the first control device 14. SCM is the control to move the vehicle 2 in a direction to avoid or mitigate the vehicle collision in a case where the object outside the vehicle 2 is detected approaching the side of the vehicle 2. RDM is the control to move the vehicle 2 in a direction to avoid or mitigate departure (deviation) of the vehicle 2 from a travel lane in a case where the departure of the vehicle 2 from the travel lane is detected or estimated. ALC is the control to automatically change lanes.

The first control device 14 is configured to execute manual driving control of the vehicle 2. When executing the manual driving control, the first control device 14 controls the powertrain 4, the brake device 5, and the steering device 6 according to the operation on the driving operation element 7 by the occupant. For example, when executing the manual driving control, the first control device 14 controls the powertrain 4 according to a signal from an accelerator pedal sensor configured to detect a pressing amount of the accelerator pedal 27, controls the brake device 5 according to a signal from a brake pedal sensor configured to detect a pressing amount of the brake pedal 28, and controls the steering device 6 according to a signal from a turning angle sensor configured to detect a turning angle of the steering wheel 26. In another embodiment, a control device configured to execute the manual driving control of the vehicle 2 may be separate from a control device configured to execute the automatic driving control of the vehicle 2.

The second control device 15 is connected to the radars 43 via the communication network. The second control device 15 receives detection signals from the radars 43 and thus integrates the received detection signals, thereby recognizing the position of the object outside the vehicle 2. The second control device 15 is connected to the first control device 14 via the communication network.

The third control device 16 is connected to the lidars 44 via the communication network. The third control device 16 receives detection signals from the lidars 44 and thus integrates the received detection signals, thereby recognizing the position of the object outside the vehicle 2. The third control device 16 is connected to the first control device 14 via the communication network.

The fourth control device 17 is connected to the powertrain 4, the brake device 5, the steering device 6, the driving operation element 7, the vehicle sensor 8, the navigation device 9, the shock absorbing device 10, the HMI 13, the first control device 14, and the like via the communication network. The fourth control device 17 is connected to the image capturing device 45 via a digital communication line. The fourth control device 17 is configured to receive the surrounding image from the image capturing device 45 and to integrate the received surrounding image. The fourth control device 17 is connected to the display device 48 via a digital communication line, and is configured to transmit the integrated surrounding image to the display device 48.

The fourth control device 17 is configured to execute automatic parking control of the vehicle 2. When executing the automatic parking control, the fourth control device 17 controls the powertrain 4, the brake device 5, and the steering device 6 regardless of the operation on the driving operation element 7 by the occupant, thereby automatically moving the vehicle 2 to a prescribed target parking position and to stop the vehicle 2 there.

Each of the first and second power supply devices 19 and 20 includes a power supply circuit and a battery. The first power supply device 19 is connected to the first control device 14, the third control device 16, and the fourth control device 17, and is configured to supply electric power to the first control device 14, the third control device 16, and the fourth control device 17. The second power supply device 20 is connected to the second control device 15, and is configured to supply electric power to the second control device 15.

The recording device 21 consists of an electronic control unit (ECU) including a CPU, a ROM, a RAM, and the like, and operates as the CPU executes arithmetic processing according to a program. The recording device 21 is connected to the fourth control device 17 via an analog communication line, and is configured to receive the surrounding image from the fourth control device 17. The recording device 21 is connected to the first control device 14 via the communication network and the fourth control device 17, and is configured to receive a recording request signal from the first control device 14. The recording device 21 is configured to record the surrounding image received from the fourth control device 17 in files for each time range in which the surrounding image is captured and to store the surrounding image in an inside area of the recording device 21 according to the recording request signal from the first control device 14. For example, while receiving the recording request signal from the first control device 14, the recording device 21 continuously (constantly) records the surrounding image received from the fourth control device 17 in the files and stores the surrounding image in the inside area of the recording device 21.

<Mode Setting and Function Classification by the First Control Device 14>

With reference to FIG. 1, the first control device 14 includes functional components such as a mode setting unit 51 and a function classifying unit 52. By using these components, the first control device 14 executes the following mode setting and the following function classification.

The mode setting unit 51 is configured to set the mode of the first control device 14 to transmittable mode or transmission stop mode. The transmittable mode is the mode in which the first control device 14 can transmit the recording request signal to the recording device 21, and the transmission stop mode is the mode in which the first control device 14 stops transmitting the recording request signal to the recording device 21.

Figure 2:
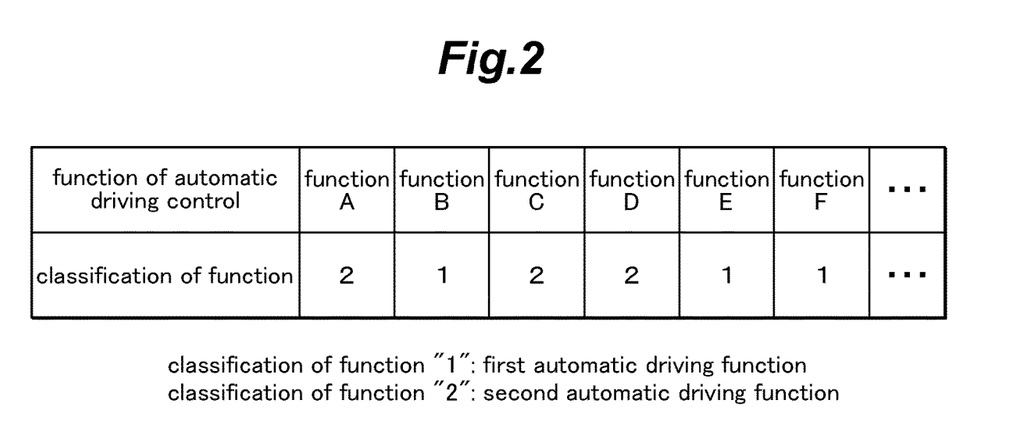
FIG. 2 is a table showing classification of automatic driving functions.

With reference to FIG. 2, the function classifying unit 52 is configured to classify functions of the automatic driving control executed by the first control device 14 based on international standards, international regulations, and the like. The function classifying unit 52 is configured to classify the functions of the automatic driving control into a first automatic driving function and a second automatic driving function. The automation level of the first automatic driving function is higher than that of the second automatic driving function. Accordingly, when the first control device 14 uses the first automatic driving function, the recording device 21 is required to record the surrounding image. On the other hand, when the first control device 14 uses the second automatic driving function, the recording device 21 is not required to record the surrounding image. For example, a lane keeping function in a state where the occupant releases his/her hands from the steering wheel 26 is classified as the first automatic driving function, and a lane keeping function in a state where the occupant grips the steering wheel 26 is classified as the second automatic driving function.

<The Restricting Control of the Automatic Driving Function>

With reference to FIG. 1, the first control device 14 includes functional components such as a mode determining unit 53, a state determining unit 54, and a function restricting unit 55. By using these components, the first control device 14 executes the following restricting control of the automatic driving function.

Figure 3:
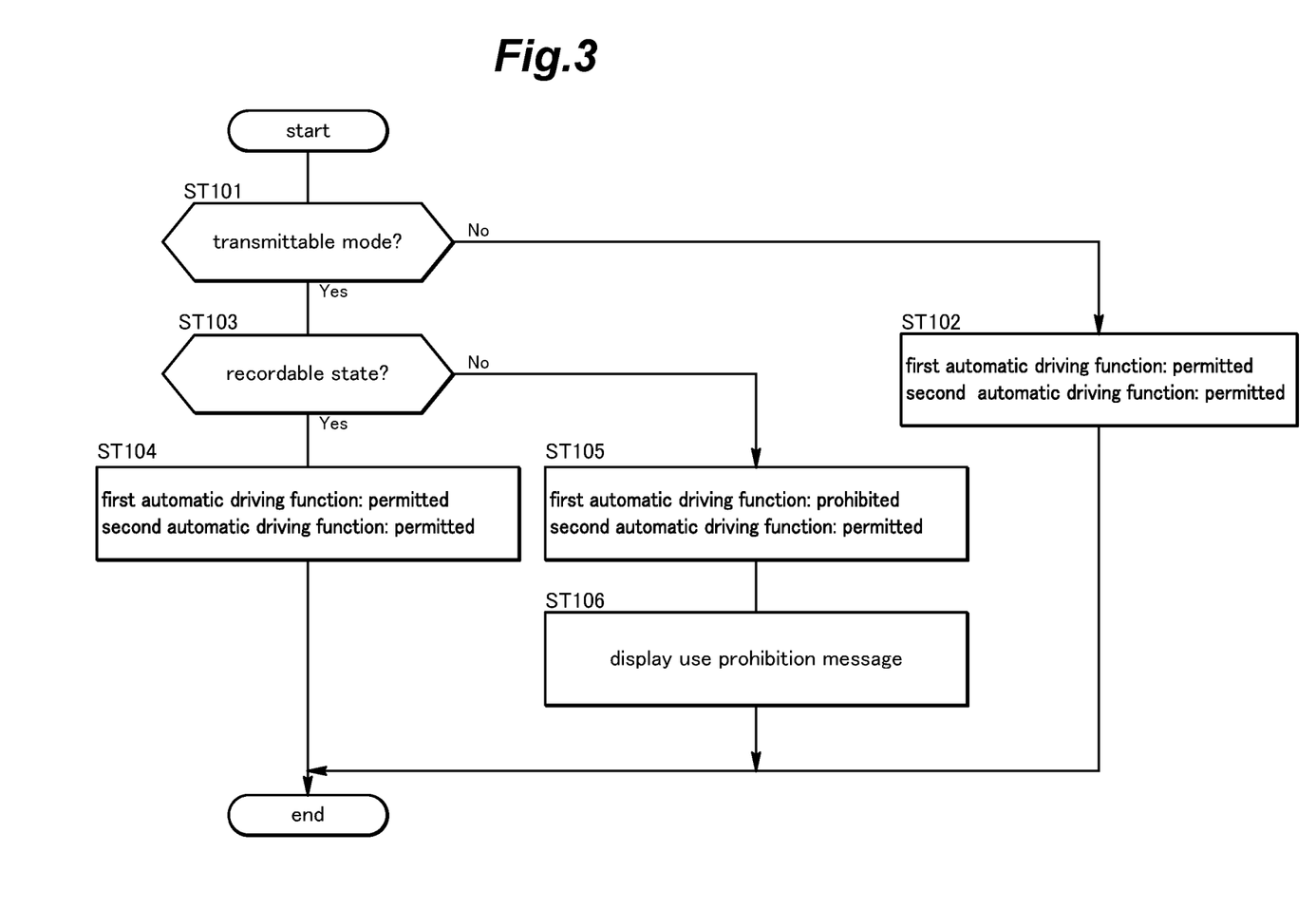
FIG. 3 is a flowchart showing restricting control of the automatic driving functions.

With reference to FIG. 3, when the restricting control of the automatic driving function is started, the mode determining unit 53 determines whether the mode of the first control device 14 is set to the transmittable mode (step ST101).

In a case where the determination in step ST101 is No (in a case where the mode determining unit 53 determines that the mode of the first control device 14 is not set to the transmittable mode), the mode of the first control device 14 is set to the transmission stop mode. In such a case, the function restricting unit 55 permits the use of both the first automatic driving function and the second automatic driving function (step ST102).

On the other hand, in a case where the determination in step ST101 is Yes (in a case where the mode determining unit 53 determines that the mode of the first control device 14 is set to the transmittable mode), the state determining unit 54 determines whether the recording device 21 is in a recordable state in which the recording device 21 can record the surrounding image (step ST103). For example, in a case where none of the following failure conditions 1 to 3 are satisfied, the state determining unit 54 determines that the recording device 21 is in the recordable state. On the other hand, in a case where at least one of the following failure conditions 1 to 3 is satisfied, the state determining unit 54 determines that the recording device 21 is not in the recordable state.

<failure condition 1> The recording device 21 cannot be used.

<failure condition 2> The recording device 21 cannot receive the surrounding image.

<failure condition 3> The recording device 21 cannot receive a save trigger signal. The save trigger signal mentioned in <failure condition 3> is a signal requesting that the surrounding image recorded in the recording device 21 be saved. In a case where a prescribed event occurs, the save trigger signal is transmitted from a device that detects occurrence of the prescribed event to the first control device 14. For example, in a case where the airbag 36 is deployed or the hood 37 is activated (partially lifted up), the save trigger signal is transmitted from the shock absorbing device 10 to the first control device 14.

In a case where the determination in step ST103 is Yes (in a case where the state determining unit 54 determines that the recording device 21 is in the recordable state), the function restricting unit 55 permits the use of both the first automatic driving function and the second automatic driving function (step ST104).

On the other hand, in a case where the determination in step ST103 is No (in a case where the state determining unit 54 determines that the recording device 21 is not in the recordable state), the function restricting unit 55 prohibits the use of the first automatic driving function and permits the use of the second automatic driving function (step ST105). Further, in a case where the determination in step ST103 is No, the display device 48 displays a use prohibition message indicating that the use of the first automatic driving function is prohibited (step ST106).

When any one of steps ST102, ST104, and ST106 ends, the restricting control of the automatic driving function ends. The above-mentioned restricting control of the automatic driving function is repeated every regular time period.

As described above, in a case where the state determining unit 54 determines that the recording device 21 is in the recordable state while the mode of the first control device 14 is set to the transmittable mode, the function restricting unit 55 permits the use of the first automatic driving function. Also, in a case where the state determining unit 54 determines that the recording device 21 is not in the recordable state while the mode of the first control device 14 is set to the transmittable mode, the function restricting unit 55 prohibits the use of the first automatic driving function. Thus, in a state where the mode of the first control device 14 is set to the transmittable mode and the recording device 21 cannot record the surrounding image, it is possible to restrict the use of the first automatic driving function that requires the recording of the surrounding image.

Further, in a state where the mode of the first control device 14 is set to the transmittable mode, the function restricting unit 55 permits the use of the second automatic driving function regardless of a determination result of the state determining unit 54. Thus, in a state where the mode of the first control device 14 is set to the transmittable mode, regardless of whether the recording device 21 is in the recordable state, it is possible to permit the use of the second automatic driving function that does not require the recording of the surrounding image and thus to reduce a driving burden on the occupant.

Further, in a state where the mode of the first control device 14 is set to the transmission stop mode, the function restricting unit 55 permits the use of the first automatic driving function regardless of the determination result of the state determining unit 54. Thus, in a state where the mode of the first control device 14 is set to the transmission stop mode, it is possible to use the first automatic driving function that requires the recording of the surrounding image while recording the surrounding image by a recorder (for example, a drive recorder on the market) other than the recording device 21. Accordingly, the vehicle control system 1 becomes more convenient. In another embodiment, in a state where the mode of the first control device 14 is set to the transmission stop mode, the function restricting unit 55 may prohibit the use of the first automatic driving function regardless of the determination result of the state determining unit 54. Thus, in a state where the mode of the first control device 14 is set to the transmission stop mode, it is possible to restrict the use of the first automatic driving function that requires the recording of the surrounding image.

Further, the display device 48 displays the use prohibition message in a case where the state determining unit 54 determines that the recording device 21 is not in the recordable state while the mode of the first control device 14 is set to the transmittable mode. Thus, in a case where the use of the first automatic driving function is prohibited since the recording device 21 is not in the recordable state, it is possible to notify the occupant of this prohibition and to prompt the occupant to inspect or replace the recording device 21. Incidentally, the display device 48 does not display the use prohibition message even if the state determining unit 54 determines that the recording device 21 is not in the recordable state while the mode of the first control device 14 is set to the transmission stop mode.

Incidentally, in a state where the mode of the first control device 14 is set to the transmittable mode, the state determining unit 54 may determine that the recording device 21 is not in the recordable state while the first automatic driving function is being used. In such a case, the display device 48 displays a request screen requesting the occupant to start driving the vehicle 2. In a case where the occupant starts driving the vehicle 2 within a prescribed time from a start of the display of the request screen, the first control device 14 causes the vehicle 2 to keep on traveling in a state where the use of the first automatic driving function is prohibited. On the other hand, in a case where the occupant does not start driving the vehicle 2 within the prescribed time from the start of the display of the request screen, the first control device 14 executes the above-mentioned MRM. Accordingly, in a state where the mode of the first control device 14 is set to the transmittable mode, the automatic driving control can be degenerated quickly if the recording device 21 can no longer record the surrounding image while the first automatic driving function is being used.

<The External Device 60>

Figure 4:
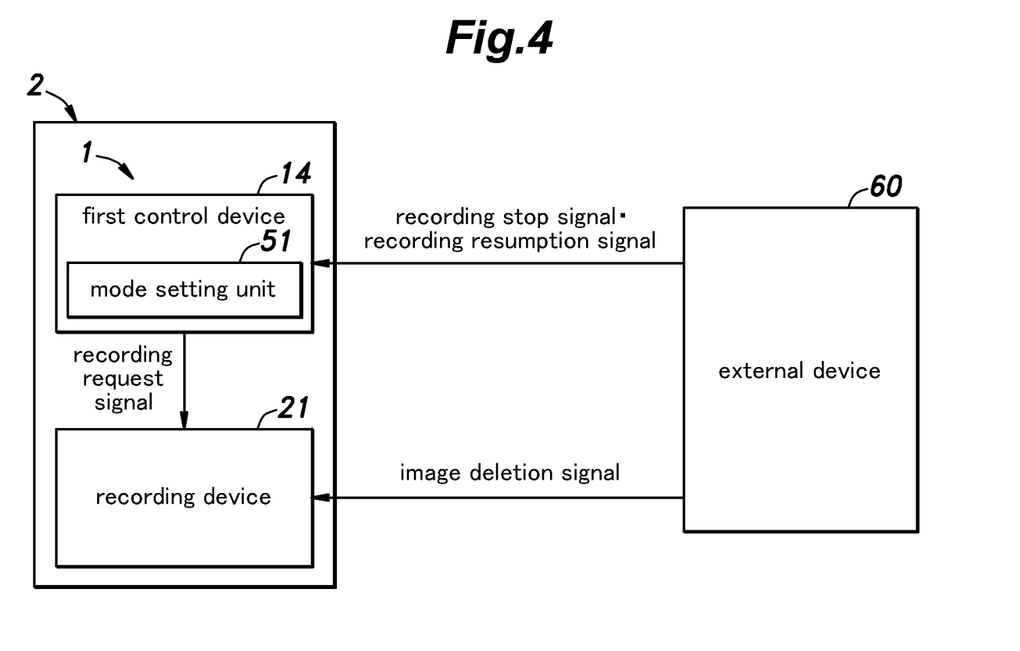
FIG. 4 is a block diagram showing relationship between the vehicle control system and an external device.

With reference to FIG. 4, the vehicle control system 1 is configured to communicate with an external device 60 provided outside the vehicle 2. Since the external device 60 is installed in a specific establishment (for example, a store where vehicles are sold or repaired), the person who can operate the external device 60 is limited to a worker of the specific establishment. Namely, the occupant of the vehicle 2 cannot operate the external device 60.

The external device 60 is configured to transmit a recording stop signal and a recording resumption signal to the first control device 14. When the first control device 14 receives the recording stop signal from the external device 60, the mode setting unit 51 switches the mode of the first control device 14 from the transmittable mode to the transmission stop mode. Accordingly, the transmission of the recording request signal from the first control device 14 to the recording device 21 is stopped, so that the recording of the surrounding image by the recording device 21 can be stopped. On the other hand, when the first control device 14 receives the recording resumption signal from the external device 60, the mode setting unit 51 switches the mode of the first control device 14 from the transmission stop mode to the transmittable mode. Accordingly, the recording request signal is transmitted from the first control device 14 to the recording device 21, so that the surrounding image can be recorded by the recording device 21. Thus, it is possible to decide whether to record the surrounding image according to a desire of the occupant, so that the vehicle control system 1 becomes more convenient.

In the present embodiment, the mode of the first control device 14 cannot be switched between the transmittable mode and the transmission stop mode by operating the display device 48, but can be switched between the transmittable mode and the transmission stop mode only by the recording stop signal or the recording resumption signal from the external device 60. Thus, it is possible to prevent the occupant from accidentally switching the mode of the first control device 14 between the transmittable mode and the transmission stop mode.

The external device 60 is configured to transmit an image deletion signal to the recording device 21. Upon receiving the image deletion signal from the external device 60, the recording device 21 deletes all the surrounding images recorded in the inside area thereof. Accordingly, the surrounding images can be deleted according to a desire of the occupant, so that the vehicle control system 1 becomes more convenient.

In the present embodiment, the surrounding images recorded in the inside area of the recording device 21 cannot be deleted by operating the display device 48, but can be deleted only by the image deletion signal from the external device 60. Accordingly, it is possible to prevent the occupant from accidentally deleting the surrounding images.

As described above, when the state determining unit 54 determines that the recording device 21 is not in the recordable state while the mode of the first control device 14 is set to the transmittable mode, the function restricting unit 55 prohibits the use of the first automatic driving function (see steps ST103 and ST105 of the restricting control of the automatic driving function). Such a state in which the function restricting unit 55 prohibits the use of the first automatic driving function (hereinafter referred to as "use prohibition state of the first automatic driving function") cannot be canceled unless the external device 60 transmits the recording stop signal to the first control device 14 and thus the mode of the first control device 14 is switched from the transmittable mode to the transmission stop mode. Consequently, the device that can cancel the use prohibition state of the first automatic driving function is limited to the external device 60, and the person who can cancel the use prohibition state of the first automatic driving function is limited to the worker of the specific establishment.

Also, when the occupant removes the recording device 21 from the vehicle 2 while the mode of the first control device 14 is set to the transmittable mode, the state determining unit 54 determines that the recording device 21 is not in the recordable state, and thus the function restricting unit 55 prohibits the use of the first automatic driving function. As described above, such a use prohibition state of the first automatic driving function cannot be canceled unless the external device 60 transmits the recording stop signal to the first control device 14 and thus the mode of the first control device 14 is switched from the transmittable mode to the transmission stop mode. Namely, in a case where the occupant removes the recording device 21 from the vehicle 2 while the mode of the first control device 14 is set to the transmittable mode, the use prohibition state of the first automatic driving function cannot be canceled unless the external device 60 is used. Consequently, the device that can replace the recording device 21 is limited to the external device 60, and the person who can replace the recording device 21 is limited to the worker of the specific establishment.

Concrete embodiments of the present invention have been described in the foregoing, but the present invention should not be limited by the foregoing embodiments and various modifications and alterations are possible within the scope of the present invention.

The invention claimed is:

1. A vehicle control system, comprising:
a control device configured to execute automatic driving control of a vehicle;
an image capturing device configured to capture a surrounding image of the vehicle; and
a recording device configured to receive the surrounding image captured by the image capturing device and record the surrounding image in files for each time range in which the surrounding image is captured,
wherein the control device includes:
a function classifying unit configured to classify functions of the automatic driving control into a first automatic driving function that requires recording of the surrounding image and a second automatic driving function that does not require the recording of the surrounding image;
a state determining unit configured to determine whether the recording device is in a recordable state in which the recording device can record the surrounding image; and
a function restricting unit configured to permit use of the first automatic driving function in a case where the state determining unit determines that the recording device is in the recordable state, and to prohibit the use of the first automatic driving function in a case where the state determining unit determines that the recording device is not in the recordable state.

2. The vehicle control system according to claim 1, wherein the function restricting unit is configured to permit use of the second automatic driving function regardless of a determination result of the state determining unit.

3. A vehicle control system, comprising:
a control device configured to execute automatic driving control of a vehicle;
an image capturing device configured to capture a surrounding image of the vehicle; and
a recording device configured to record the surrounding image,
wherein the control device includes:
a function classifying unit configured to classify functions of the automatic driving control into a first automatic driving function that requires recording of the surrounding image and a second automatic driving function that does not require the recording of the surrounding image;
a state determining unit configured to determine whether the recording device is in a recordable state in which the recording device can record the surrounding image; and
a function restricting unit configured to permit use of the first automatic driving function in a case where the state determining unit determines that the recording device is in the recordable state, and to prohibit the use of the first automatic driving function in a case where the state determining unit determines that the recording device is not in the recordable state,
wherein the recording device is configured to record the surrounding image in response to a recording request signal from the control device, and
a mode of the control device is switchable between a transmittable mode in which the control device can transmit the recording request signal to the recording device and a transmission stop mode in which the control device stops transmitting the recording request signal to the recording device.

4. The vehicle control system according to claim 3, wherein in a case where the state determining unit determines that the recording device is in the recordable state while the mode of the control device is set to the transmittable mode, the function restricting unit permits the use of the first automatic driving function, and
in a case where the state determining unit determines that the recording device is not in the recordable state while the mode of the control device is set to the transmittable mode, the function restricting unit prohibits the use of the first automatic driving function.

5. The vehicle control system according to claim 4, wherein the function restricting unit is configured to permit the use of the first automatic driving function regardless of a determination result of the state determining unit while the mode of the control device is set to the transmission stop mode.

6. The vehicle control system according to claim 4, wherein the function restricting unit is configured to prohibit the use of the first automatic driving function regardless of a determination result of the state determining unit while the mode of the control device is set to the transmission stop mode.

7. The vehicle control system according to claim 3, wherein the mode of the control device is switchable between the transmittable mode and the transmission stop mode only in response to a signal from an external device.

8. The vehicle control system according to claim 1, further comprising a display device configured to indicate that the use of the first automatic driving function is prohibited in the case where the state determining unit determines that the recording device is not in the recordable state.

9. The vehicle control system according to claim 1, wherein the image capturing device includes plural cameras configured to capture images of a front side, a rear side, a left side, and a right side of the vehicle, respectively.

\* \* \* \* \*